(12) United States Patent
Leung

(10) Patent No.: US 7,237,188 B1
(45) Date of Patent: Jun. 26, 2007

(54) METHOD AND SYSTEM FOR MANAGING DYNAMIC TABLES

(75) Inventor: Yiu-Ming Leung, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 433 days.

(21) Appl. No.: 10/773,619

(22) Filed: Feb. 6, 2004

(51) Int. Cl.
G06F 15/00 (2006.01)
(52) U.S. Cl. .................................. 715/509; 715/503
(58) Field of Classification Search ............... 715/503, 715/504, 509, 510
See application file for complete search history.

(56) References Cited

U.S. PATENT DOCUMENTS

| | | | | |
|---|---|---|---|---|
| 5,613,131 | A * | 3/1997 | Moss et al. ............... | 715/509 |
| 6,065,022 | A * | 5/2000 | Ueki ....................... | 715/503 |
| 6,247,030 | B1 * | 6/2001 | Suzuki ..................... | 715/509 |
| 6,317,750 | B1 * | 11/2001 | Tortolani et al. ........ | 707/103 R |
| 6,457,000 | B1 * | 9/2002 | Witkowski et al. ....... | 707/2 |
| 6,687,875 | B1 * | 2/2004 | Suzuki ..................... | 715/503 |
| 6,763,500 | B2 * | 7/2004 | Black et al. .............. | 715/513 |
| 6,986,099 | B2 * | 1/2006 | Todd ....................... | 715/503 |
| 6,990,480 | B1 * | 1/2006 | Burt ........................ | 707/1 |
| 7,127,672 | B1 * | 10/2006 | Patterson et al. ......... | 715/503 |
| 2002/0174142 | A1 * | 11/2002 | Demers et al. ........... | 707/509 |
| 2003/0033330 | A1 * | 2/2003 | Black et al. .............. | 707/513 |
| 2004/0111666 | A1 * | 6/2004 | Hollcraft .................. | 715/503 |
| 2005/0015379 | A1 * | 1/2005 | Aureglia et al. .......... | 707/100 |
| 2005/0091206 | A1 * | 4/2005 | Koukerdjinian et al. ..... | 707/3 |
| 2005/0154974 | A1 * | 7/2005 | Gao et al. ................. | 715/509 |
| 2006/0048045 | A1 * | 3/2006 | Lehenbauer et al. ........ | 715/509 |
| 2006/0069635 | A1 * | 3/2006 | Ram et al. ................ | 705/37 |
| 2006/0075328 | A1 * | 4/2006 | Becker et al. ............. | 715/503 |
| 2006/0101326 | A1 * | 5/2006 | Todd ....................... | 715/503 |

OTHER PUBLICATIONS

Palmer et al., Operation Transforms for a Distributed Shared Spreadsheet, ACM 1998, pp. 69-78.*
Iwerks et al., The Internet Spatial Spreadsheet: Enabling Remote Visualization of Dynamic Spatial Data and Ongoing Query Results over a Network, ACM 2003, pp. 154-160.*
Microsoft Excel 2000, screenshots, pp. 1-6.*
Wolber et al., Designing Dynamic Web Pages and Persistence in the WYSIWYG Interface, ACM 2002, pp. 1-2.*
Belthoff, WordPerfect Tables: Useful Tools for Organizing Information, Google Jan. 2004, pp. 1-7.*
Instant Update [online graphs and charts], New Architect, vol. 8, No. 1, pp. 26-29, by P. Sholtz, published Jan. 2003 in USA.

* cited by examiner

Primary Examiner—Cong-Lac Huynh
(74) Attorney, Agent, or Firm—Merchant & Gould P.C.

(57) ABSTRACT

A method and system for modifying a dynamic table within an array includes inserting or deleting one or more records from the table while maintaining the integrity of subsequent tables within the array. The method first determines which subsequent tables at least partially overlap the boundary of the modified table, wherein the overlapping portions are shifted by the changes to the modified table. Next, the invention shifts the non-overlapping (unaltered) portions of the subsequent tables so that the two separate portions of the subsequent table are properly aligned and the integrity of the data within the subsequent table is maintained. In the case where data records are deleted from the modified table, the method first determines if a shift of the non-overlapping portions of the subsequent data would compromise any existing cell data within the array and then adjusts both the overlapping and the non-overlapping portions in order to reintegrate the entire subsequent table.

25 Claims, 16 Drawing Sheets

|   | A | B | C | D | E | F | G | H | I |
|---|---|---|---|---|---|---|---|---|---|
| 1 |   |   |   | Checking Account |   |   | ⌒120 |   |   |
| 2 |   |   | Check No. | Date | Amount | Desc. |   |   |   |
| 3 |   |   | 1571 | 02/01/04 | $15.00 | Pizza |   |   |   |
| 4 |   |   | 1572 | 02/02/04 | $250.00 | Car Loan |   |   |   |
| 5 |   |   | 1573 | 02/02/04 | $60.00 | Groceries |   |   |   |
| 6 |   |   | 1574 | 02/05/04 | $55.00 | Cable TV |   |   |   |
| 7 |   | ◄─LCR 1─► | ◄── | ──UCR 1── | ── | ──► | ◄── | ─RCR 1─► | 510 |
| 8 |   |   |   |   |   |   |   |   |   |
| 9 | 130 |   |   |   |   |   |   | Updated: | 02/06/04 |
| 10 |   |   | 1999 | 2000 | 2001 | 2002 | 20003 | 2004 |   |
| 11 |   | Checking | $5,500 | $5,000 | $4,000 | $6,500 | $7,000 | $7,500 |   |
| 12 |   | Savings | $7,000 | $6,000 | $3,000 | $3,500 | $4,000 | $5,000 |   |
| 13 |   | Brokerage | $20,000 | $15,000 | $4,500 | $5,000 | $6,500 | $7,000 |   |
| 14 | ◄─LCR 2─► | ◄── | ── | ──UCR 2── | ── | ── | ──► |   |   |
| 15 |   |   |   |   |   |   |   |   |   |
| 16 |   |   |   |   |   |   |   |   |   |
| 17 |   |   |   |   |   |   |   |   |   |
| 18 |   | Credit Card | Date | Amount | Balance |   |   |   |   |
| 19 |   | Visa | 02/03/04 | $125.00 | $750.00 |   |   |   |   |
| 20 |   | MC | 02/04/04 | $235.00 | $450.00 | ⌒140 |   |   |   |
| 21 |   | Discover | 02/06/04 | $875.00 | $925.00 |   |   |   |   |
| 22 | ◄── | ── | ── | ──UCR 3── | ── | ──► |   |   |   |

FIG. 5

|    | A | B | C | D | E | F | G | H | I |
|----|---|---|---|---|---|---|---|---|---|
| 1  |   |   | Checking Account | | | | | | |
| 2  |   |   | Check No. | Date | Amount | Desc. | 120 | | |
| 3  |   |   | 1571 | 02/01/04 | $15.00 | Pizza | | | |
| 4  |   |   | 1572 | 02/02/04 | $250.00 | Car Loan | | | |
| 5  |   |   | 1573 | 02/02/04 | $60.00 | Groceries | | | |
| 6  |   |   | 1574 | 02/05/04 | $55.00 | Cable TV | | | |
| 7  |   |   | 1575 | 02/07/04 | $30.00 | Books | 620 | | |
| 8  | 130 |   | 1576 | 02/08/04 | $45.00 | Cell Phone | | | |
| 9  |   |   |   |   |   |   |   | Updated: | 02/08/04 |
| 10 |   |   |   |   |   |   | 20003 | 2004 | |
| 11 |   | Checking |   |   |   |   | $7,000 | $7,500 | |
| 12 |   | Savings | 1999 | 2000 | 2001 | 2002 | $4,000 | $5,000 | |
| 13 |   | Brokerage | $5,500 | $5,000 | $4,000 | $6,500 | $6,500 | $7,000 | |
| 14 |   |   | $7,000 | $6,000 | $3,000 | $3,500 | | | |
| 15 |   |   | $20,000 | $15,000 | $4,500 | $5,000 | 630 | | |
| 16 |   |   |   |   |   |   |   |   |   |
| 17 |   |   |   |   |   |   |   |   |   |
| 18 | Credit Card | Date |   |   |   |   |   |   |   |
| 19 | Visa | 02/03/04 |   |   |   |   |   |   |   |
| 20 | MC | 02/04/04 | Amount | Balance |   |   |   |   |   |
| 21 | Discover | 02/06/04 | $125.00 | $750.00 |   |   |   |   |   |
| 22 |   |   | $235.00 | $450.00 |   |   |   |   |   |
| 23 |   |   | $875.00 | $925.00 | 640 |   |   |   |   |
| 24 |   |   |   |   |   |   |   |   |   |
| 25 | 140 |   |   |   |   |   |   |   |   |
| 26 |   |   |   |   |   |   |   |   |   |
| 27 |   |   |   |   |   |   |   |   |   |
| 28 |   |   |   |   |   |   |   |   |   |
| 29 |   |   |   |   |   |   |   |   |   |
| 30 |   |   |   |   |   |   |   |   |   |

Sheet1 / Sheet2 / Sheet3
Ready

|     | A | B | C | D | E | F | G | H | I |
|---|---|---|---|---|---|---|---|---|---|
| 1 |   |   | Checking Account |   |   |   |   |   |   |
| 2 |   |   | Check No. | Date | Amount | Desc. |   |   |   |
| 3 |   |   | 1571 | 02/01/04 | $15.00 | Pizza | 120 |   |   |
| 4 |   |   | 1572 | 02/02/04 | $250.00 | Car Loan |   |   |   |
| 5 |   |   | 1573 | 02/02/04 | $60.00 | Groceries |   |   |   |
| 6 |   |   | 1574 | 02/05/04 | $55.00 | Cable TV |   |   |   |
| 7 |   |   | 1575 | 02/07/04 | $30.00 | Books |   |   |   |
| 8 |   |   | 1576 | 02/08/04 | $45.00 | Cell Phone |   |   |   |
| 9 |   |   |   |   |   |   |   | Updated: | 02/08/04 |
| 10 | 730 |   |   |   |   |   |   |   |   |
| 11 |   |   |   |   |   |   |   |   |   |
| 12 |   |   | 1999 | 2000 | 2001 | 2002 | 20003 | 2004 |   |
| 13 |   | Checking | $5,500 | $5,000 | $4,000 | $6,500 | $7,000 | $7,500 |   |
| 14 |   | Savings | $7,000 | $6,000 | $3,000 | $3,500 | $4,000 | $5,000 |   |
| 15 |   | Brokerage | $20,000 | $15,000 | $4,500 | $5,000 | $6,500 | $7,000 |   |
| 16 |   |   |   |   |   |   |   |   |   |
| 17 |   |   |   |   |   | 130 |   | 732 |   |
| 18 | Credit Card |   |   |   |   |   |   |   |   |
| 19 | Visa |   |   |   |   |   |   |   |   |
| 20 | MC | Date | Amount | Balance |   |   |   |   |   |
| 21 | Discover | 02/03/04 | $125.00 | $750.00 |   |   |   |   |   |
| 22 |   | 02/04/04 | $235.00 | $450.00 |   |   |   |   |   |
| 23 |   | 02/06/04 | $875.00 | $925.00 |   |   |   |   |   |
| 24 |   |   |   |   |   |   |   |   |   |
| 25 |   |   |   |   |   |   |   |   |   |
| 26 |   |   | 740 |   |   |   |   |   |   |
| 27 |   |   |   | 140 |   |   |   |   |   |
| 28 |   |   |   |   |   |   |   |   |   |
| 29 |   |   |   |   |   |   |   |   |   |
| 30 |   |   |   |   |   |   |   |   |   |

FIG. 7

|   | A | B | C | D | E | F | G | H | I |
|---|---|---|---|---|---|---|---|---|---|
| 1 |   |   | Checking Account | | | | | | |
| 2 |   |   | Check No. | Date | Amount | Desc. | | | |
| 3 |   |   | 1571 | 02/01/04 | $15.00 | Pizza | | | |
| 4 |   |   | 1572 | 02/02/04 | $250.00 | Car Loan | ~120 | | |
| 5 |   |   | 1573 | 02/02/04 | $60.00 | Groceries | | | |
| 6 |   |   | 1574 | 02/05/04 | $55.00 | Cable TV | | | |
| 7 |   |   | 1575 | 02/07/04 | $30.00 | Books | | | |
| 8 |   |   | 1576 | 02/08/04 | $45.00 | Cell Phone | | | |
| 9 |   |   |   |   |   |   |   | Updated: | 02/08/04 |
| 10 |   |   |   |   |   |   |   |   |   |
| 11 |   |   |   |   |   |   |   |   |   |
| 12 |   |   | 1999 | 2000 | 2001 | 2002 | 20003 | 2004 |   |
| 13 |   | Checking | $5,500 | $5,000 | $4,000 | $6,500 | $7,000 | $7,500 |   |
| 14 |   | Savings | $7,000 | $6,000 | $3,000 | $3,500 | $4,000 | $5,000 |   |
| 15 |   | Brokerage | $20,000 | $15,000 | $4,500 | $5,000 | $6,500 | $7,000 |   |
| 16 |   |   |   |   |   |   |   |   |   |
| 17 |   |   |   |   |   |   |   |   |   |
| 18 |   |   |   |   | 130 |   |   |   |   |
| 19 |   |   |   |   |   |   |   |   |   |
| 20 | Credit Card | Date | Amount | Balance |   |   |   |   |   |
| 21 | Visa | 02/03/04 | $125.00 | $750.00 |   |   |   |   |   |
| 22 | MC | 02/04/04 | $235.00 | $450.00 |   |   |   |   |   |
| 23 | Discover | 02/06/04 | $875.00 | $925.00 |   |   |   |   |   |
| 24 |   |   |   |   |   |   |   |   |   |
| 25 |   |   |   |   |   |   |   |   |   |
| 26 |   | 840 |   |   |   |   |   |   |   |
| 27 |   |   |   | 140 |   |   |   |   |   |
| 28 |   |   |   |   |   |   |   |   |   |
| 29 |   |   |   |   |   |   |   |   |   |
| 30 |   |   |   |   |   |   |   |   |   |

FIG. 8

| | A | B | C | D | E | F | G | H | I |
|---|---|---|---|---|---|---|---|---|---|
| 1 | | | Checking Account | | | | | | |
| 2 | | | Check No. | Date | Amount | Desc. | | | |
| 3 | | | 1571 | 02/01/04 | $15.00 | Pizza | ~1000 | | |
| 4 | | | 1572 | 02/02/04 | $250.00 | Car Loan | | | |
| 5 | | | 1573 | 02/02/04 | $60.00 | Groceries | | | |
| 6 | | | 1574 | 02/05/04 | $55.00 | Cable TV | | | 510 |
| 7 | | | 1575 | 02/07/04 | $30.00 | Books | ~120 | | |
| 8 | | | 1576 | 02/08/04 | $45.00 | Cell Phone | | | |
| 9 | | | ◄────── UCR 1 ──────► | | | | | Updated: | 02/09/04 |
| 10 | | | | | | | | | |
| 11 | | ◄LCR 1► | | | | | ◄───── RCR 1 ─────► | | |
| 12 | 130 | | 1999 | 2000 | 2001 | 2002 | 20003 | 2004 | |
| 13 | | Checking | $5,500 | $5,000 | $4,000 | $6,500 | $7,000 | $7,500 | |
| 14 | | Savings | $7,000 | $6,000 | $3,000 | $3,500 | $4,000 | $5,000 | |
| 15 | | Brokerage | $20,000 | $15,000 | $4,500 | $5,000 | $6,500 | $7,000 | |
| 16 | | ◄─────────── UCR 2 ───────────► | | | | | | | |
| 17 | | | | | | | | | |
| 18 | | | | | | | | | |
| 19 | ◄LCR 2► | | | | | | | | |
| 20 | | Credit Card | Date | Amount | Balance | | | | |
| 21 | | Visa | 02/03/04 | $125.00 | $750.00 | | | | |
| 22 | | MC | 02/04/04 | $235.00 | $450.00 | ~140 | | | |
| 23 | | Discover | 02/06/04 | $875.00 | $925.00 | | | | |
| 24 | ◄─────────── UCR 3 ───────────► | | | | | | | | |

FIG. 10

|   | A | B | C | D | E | F | G | H | I |
|---|---|---|---|---|---|---|---|---|---|
| 1 |   |   | Checking Account |   |   |   |   |   |   |
| 2 |   |   | Check No. | Date | Amount | Desc. |   |   |   |
| 3 |   |   | 1574 | 02/05/04 | $55.00 | Cable TV | ~120 |   |   |
| 4 |   |   | 1575 | 02/07/04 | $30.00 | Books |   |   |   |
| 5 |   |   | 1576 | 02/08/04 | $45.00 | Cell Phone |   |   |   |
| 6 |   |   |   |   |   |   |   | 510 |   |
| 7 |   |   |   |   |   |   |   |   |   |
| 8 |   |   |   |   |   |   |   |   |   |
| 9 |   |   | 1999 | 2000 | 2001 | 2002 |   | Updated: | 02/09/04 |
| 10 |   | 130 | $5,500 | $5,000 | $4,000 | $6,500 |   |   |   |
| 11 |   |   | $7,000 | $6,000 | $3,000 | $3,500 |   |   |   |
| 12 |   |   | $20,000 | $15,000 | $4,500 | $5,000 | 20003 | 2004 |   |
| 13 |   | Checking |   |   |   |   | $7,000 | $7,500 |   |
| 14 |   | Savings |   |   |   |   | $4,000 | $5,000 |   |
| 15 |   | Brokerage |   |   |   | 1130 | $6,500 | $7,000 |   |
| 16 |   |   |   |   |   |   |   |   |   |
| 17 |   |   | Amount | Balance |   |   |   |   |   |
| 18 |   |   | $125.00 | $750.00 |   |   |   |   |   |
| 19 |   |   | $235.00 | $450.00 |   |   |   |   |   |
| 20 | Credit Card | Date | $875.00 | $925.00 |   |   |   |   |   |
| 21 | Visa | 02/03/04 |   |   |   |   |   |   |   |
| 22 | MC | 02/04/04 | 140 |   | 1140 |   |   |   |   |
| 23 | Discover | 02/06/04 |   |   |   |   |   |   |   |
| 24 |   |   |   |   |   |   |   |   |   |
| 25 |   |   |   |   |   |   |   |   |   |
| 26 |   |   |   |   |   |   |   |   |   |
| 27 |   |   |   |   |   |   |   |   |   |
| 28 |   |   |   |   |   |   |   |   |   |
| 29 |   |   |   |   |   |   |   |   |   |
| 30 |   |   |   |   |   |   |   |   |   |

FIG. 11

|   | A | B | C | D | E | F | G | H | I |
|---|---|---|---|---|---|---|---|---|---|
| 1 |   |   | Checking Account | | | | | | |
| 2 |   |   | Check No. | Date | Amount | Desc. | | | |
| 3 |   | 120 | 1574 | 02/05/04 | $55.00 | Cable TV | | | |
| 4 |   |   | 1575 | 02/07/04 | $30.00 | Books | | | |
| 5 |   |   | 1576 | 02/08/04 | $45.00 | Cell Phone | | | |
| 6 |   |   |   |   |   |   |   | 510 | |
| 7 |   |   |   |   |   |   |   |   |   |
| 8 |   |   |   |   |   |   |   |   |   |
| 9 | 1230 |   | 1999 | 2000 | 2001 | 2002 |   | Updated: | 02/09/04 |
| 10 |   |   | $5,500 | $5,000 | $4,000 | $6,500 |   |   |   |
| 11 |   |   | $7,000 | $6,000 | $3,000 | $3,500 |   |   |   |
| 12 |   |   | $20,000 | $15,000 | $4,500 | $5,000 | 20003 | 2004 |   |
| 13 |   | Checking |   |   |   |   | $7,000 | $7,500 | 1232 |
| 14 |   | Savings |   |   | 130 |   | $4,000 | $5,000 |   |
| 15 |   | Brokerage |   |   |   |   | $6,500 | $7,000 |   |
| 16 |   |   |   |   |   |   |   |   |   |
| 17 |   |   | Amount | Balance |   |   |   |   |   |
| 18 |   |   | $125.00 | $750.00 |   |   |   |   |   |
| 19 |   |   | $235.00 | $450.00 |   |   |   |   |   |
| 20 | Credit Card | Date | $875.00 | $925.00 |   |   |   |   |   |
| 21 | Visa | 02/03/04 |   |   |   |   |   |   |   |
| 22 | MC | 02/04/04 |   |   |   |   |   |   |   |
| 23 | Discover | 02/06/04 |   |   |   |   |   |   |   |
| 24 |   |   |   |   |   |   |   |   |   |
| 25 |   |   |   |   |   |   |   |   |   |
| 26 |   |   | 140 |   |   |   |   |   |   |
| 27 |   |   |   |   |   |   |   |   |   |
| 28 |   |   |   |   |   |   |   |   |   |
| 29 |   |   |   |   |   |   |   |   |   |
| 30 |   |   |   |   |   |   |   |   |   |

FIG. 12

|    | A | B | C | D | E | F | G | H | I |
|---|---|---|---|---|---|---|---|---|---|
| 1  |   |   | Checking Account | | | | | | |
| 2  |   |   | Check No. | Date | Amount | Desc. | | | |
| 3  | 120 |   | 1574 | 02/05/04 | $55.00 | Cable TV | | | |
| 4  |   |   | 1575 | 02/07/04 | $30.00 | Books | | | |
| 5  |   |   | 1576 | 02/08/04 | $45.00 | Cell Phone | | | |
| 6  |   |   |   |   |   |   |   |   |   |
| 7  |   |   |   |   |   |   |   |   |   |
| 8  |   |   |   |   |   |   |   |   |   |
| 9  |   |   | 1999 | 2000 | 2001 | 2002 |   | Updated: | 02/09/04 |
| 10 |   |   | $5,500 | $5,000 | $4,000 | $6,500 |   |   |   |
| 11 |   |   | $7,000 | $6,000 | $3,000 | $3,500 |   |   |   |
| 12 |   |   | $20,000 | $15,000 | $4,500 | $5,000 | 20003 | 2004 |   |
| 13 |   | Checking |   |   |   |   |   | $7,000 | $7,500 |
| 14 |   | Savings |   |   | 130 |   |   | $4,000 | $5,000 |
| 15 |   | Brokerage |   |   |   |   |   | $6,500 | $7,000 |
| 16 |   |   |   |   |   |   |   |   |   |
| 17 |   |   | Amount | Balance |   |   |   |   |   |
| 18 |   | 1340 | $125.00 | $750.00 |   |   |   |   |   |
| 19 |   |   | $235.00 | $450.00 |   |   |   |   |   |
| 20 | Credit Card | Date | $875.00 | $925.00 |   |   |   |   |   |
| 21 | Visa | 02/03/04 |   |   |   |   |   |   |   |
| 22 | MC | 02/04/04 |   |   | 140 |   |   |   |   |
| 23 | Discover | 02/06/04 |   |   |   |   |   |   |   |
| 24 |   |   |   |   |   |   |   |   |   |
| 25 |   |   |   |   |   |   |   |   |   |
| 26 |   |   |   |   |   |   |   |   |   |
| 27 |   |   |   |   |   |   |   |   |   |
| 28 |   |   |   |   |   |   |   |   |   |
| 29 |   |   |   |   |   |   |   |   |   |
| 30 |   |   |   |   |   |   |   |   |   |

FIG. 13

| | A | B | C | D | E | F | G | H | I |
|---|---|---|---|---|---|---|---|---|---|
| 1 | | | Checking Account | | | | | | |
| 2 | | 120 | Check No. | Date | Amount | Desc. | | | |
| 3 | | | 1574 | 02/05/04 | $55.00 | Cable TV | | | |
| 4 | | | 1575 | 02/07/04 | $30.00 | Books | | | |
| 5 | | | 1576 | 02/08/04 | $45.00 | Cell Phone | | | |
| 6 | | | | | | | 1420 | | |
| 7 | | | | | | | | | |
| 8 | | | | | | | | | |
| 9 | | | | | | | | Updated: | 02/09/04 |
| 10 | | | 1999 | 2000 | 2001 | 2002 | | | |
| 11 | | | $5,500 | $5,000 | $4,000 | $6,500 | | | |
| 12 | | | $7,000 | $6,000 | $3,000 | $3,500 | 20003 | 2004 | |
| 13 | | Checking | $20,000 | $15,000 | $4,500 | $5,000 | $7,000 | $7,500 | |
| 14 | | Savings | | | | | $4,000 | $5,000 | |
| 15 | | Brokerage | | | | | $6,500 | $7,000 | |
| 16 | | | | | | 1130 | | | |
| 17 | | | | | | | 130 | | |
| 18 | | | Amount | Balance | | | | | |
| 19 | | | $125.00 | $750.00 | | | | | |
| 20 | Credit Card | Date | $235.00 | $450.00 | 1140 | | | | |
| 21 | Visa | 02/03/04 | $875.00 | $925.00 | | | | | |
| 22 | MC | 02/04/04 | | | | | | | |
| 23 | Discover | 02/06/04 | | | | | | | |
| 24 | | | 140 | | | | | | |
| 25 | | | | | | | | | |
| 26 | | | | | | | | | |
| 27 | | | | | | | | | |
| 28 | | | | | | | | | |
| 29 | | | | | | | | | |
| 30 | | | | | | | | | |

Sheet1 / Sheet2 / Sheet3 /

Ready

FIG. 14

|   | A | B | C | D | E | F | G | H | I |
|---|---|---|---|---|---|---|---|---|---|
| 1 |   |   |   | Checking Account |   |   |   |   |   |
| 2 |   | 120 | Check No. | Date | Amount | Desc. |   |   |   |
| 3 |   |   | 1574 | 02/05/04 | $55.00 | Cable TV |   |   |   |
| 4 |   |   | 1575 | 02/07/04 | $30.00 | Books |   |   |   |
| 5 |   |   | 1576 | 02/08/04 | $45.00 | Cell Phone |   |   |   |
| 6 |   |   |   |   |   |   |   |   |   |
| 7 | 1530 |   |   |   |   |   |   | 510 |   |
| 8 |   |   |   |   |   | 1532 |   |   |   |
| 9 |   |   |   |   |   |   |   | Updated: | 02/09/04 |
| 10 |   |   | 1999 | 2000 | 2001 | 2002 |   |   |   |
| 11 |   |   | $5,500 | $5,000 | $4,000 | $6,500 |   |   |   |
| 12 |   |   | $7,000 | $6,000 | $3,000 | $3,500 | 20003 | 2004 |   |
| 13 |   | Checking | $20,000 | $15,000 | $4,500 | $5,000 | $7,000 | $7,500 |   |
| 14 |   | Savings |   |   |   |   | $4,000 | $5,000 |   |
| 15 |   | Brokerage |   |   |   |   | $6,500 | $7,000 |   |
| 16 |   |   |   |   |   | 130 |   |   |   |
| 17 |   | 1540 |   |   |   |   |   |   |   |
| 18 |   |   | Amount | Balance |   |   |   |   |   |
| 19 |   |   | $125.00 | $750.00 |   |   |   |   |   |
| 20 | Credit Card | Date | $235.00 | $450.00 |   |   |   |   |   |
| 21 | Visa | 02/03/04 | $875.00 | $925.00 |   |   |   |   |   |
| 22 | MC | 02/04/04 |   |   | 140 |   |   |   |   |
| 23 | Discover | 02/06/04 |   |   |   |   |   |   |   |
| 24 |   |   |   |   |   |   |   |   |   |
| 25 |   |   |   |   |   |   |   |   |   |
| 26 |   |   |   |   |   |   |   |   |   |
| 27 |   |   |   |   |   |   |   |   |   |
| 28 |   |   |   |   |   |   |   |   |   |
| 29 |   |   |   |   |   |   |   |   |   |
| 30 |   |   |   |   |   |   |   |   |   |

FIG. 15

|   | A | B | C | D | E | F | G | H | I |
|---|---|---|---|---|---|---|---|---|---|
| 1 |   | 120 |   | Checking Account |   |   |   |   |   |
| 2 |   |   | Check No. | Date | Amount | Desc. |   |   |   |
| 3 |   |   | 1574 | 02/05/04 | $55.00 | Cable TV |   |   |   |
| 4 |   |   | 1575 | 02/07/04 | $30.00 | Books |   |   |   |
| 5 |   |   | 1576 | 02/08/04 | $45.00 | Cell Phone |   |   |   |
| 6 |   |   |   |   |   |   |   |   |   |
| 7 |   | 1630 |   |   |   |   |   |   |   |
| 8 |   |   |   |   |   | 1632 |   |   |   |
| 9 |   |   |   |   |   |   |   | Updated: | 02/09/04 |
| 10 |   |   | 1999 | 2000 | 2001 | 2002 | 20003 | 2004 |   |
| 11 |   | Checking | $5,500 | $5,000 | $4,000 | $6,500 | $7,000 | $7,500 |   |
| 12 |   | Savings | $7,000 | $6,000 | $3,000 | $3,500 | $4,000 | $5,000 |   |
| 13 |   | Brokerage | $20,000 | $15,000 | $4,500 | $5,000 | $6,500 | $7,000 |   |
| 14 |   |   |   |   |   |   |   |   |   |
| 15 |   |   |   |   |   |   |   |   |   |
| 16 |   |   |   |   | 130 |   |   |   |   |
| 17 |   |   |   |   |   |   |   |   |   |
| 18 | Credit Card | Date | Amount | Balance |   |   |   |   |   |
| 19 | Visa | 02/03/04 | $125.00 | $750.00 |   |   |   |   |   |
| 20 | MC | 02/04/04 | $235.00 | $450.00 |   |   |   |   |   |
| 21 | Discover | 02/06/04 | $875.00 | $925.00 |   |   |   |   |   |
| 22 |   |   |   |   |   | 140 |   |   |   |
| 23 |   |   |   |   |   |   |   |   |   |
| 24 |   |   |   |   |   |   |   |   |   |
| 25 |   |   |   |   |   |   |   |   |   |
| 26 |   | 1640 | 1642 |   |   |   |   |   |   |
| 27 |   |   |   |   |   |   |   |   |   |
| 28 |   |   |   |   |   |   |   |   |   |
| 29 |   |   |   |   |   |   |   |   |   |
| 30 |   |   |   |   |   |   |   |   |   |

FIG. 16

METHOD AND SYSTEM FOR MANAGING DYNAMIC TABLES

TECHNICAL FIELD

The present invention relates to methods and systems for updating tables in an array such as a spreadsheet. More particularly, the present invention relates to managing dynamic tables so that the integrity of lower tables in a spreadsheet is not compromised when the dynamic table either grows or contracts.

BACKGROUND OF THE INVENTION

Computer spreadsheet applications allows users to store, organize and relate large amounts of numerical data. Specifically, a spreadsheet typically comprises a plurality of cells, arranged in rows and columns wherein each cell is identified by its X-Y position in the spreadsheet. Groups of cells may be logically grouped within a spreadsheet to define a table, and a single spreadsheet may contain multiple tables. In addition to conventional two-dimensional spreadsheets, a "table" may also exist as a subset of data within an N-dimensional array. Additionally, a table may exist in a static form or a table may be dynamic such as when the table is related to a separate database that is periodically updated with new data or such as when a user manually adds or deletes data from the table.

One example of a database that allows dynamic tables to grow and contract is a banking database where information regarding a user's various bank accounts may be downloaded to a plurality of different tables within a spreadsheet. FIG. 1 illustrates such an exemplary spreadsheet 110 having a plurality of tables such as the tables 120, 130 and 140. Upon connection to an online database (such as a bank), the spreadsheet 110 may be automatically updated by importing new data into the table 120 that represents a user's checking account.

While previous spreadsheet applications could handle the importation of data into a table, these prior applications could not adequately address the situation where a table (such as the table 120 in FIG. 1) might grow so large that it runs into a lower table (such as the table 130 in FIG. 1). Some spreadsheet applications might refuse to accept any further data once the modified table bumps into a lower table, while other applications might allow a table to expand into and overwrite a lower table, thereby breaking the integrity of the lower table.

Even if a spreadsheet application were simply to insert new rows to account for the newly imported data, such row insertions might still destroy the integrity of lower tables (such as the tables 130 and 140 in FIG. 1) to the extent that portions of the lower tables might be pushed downward within the spreadsheet below the remainder of the table. Thus, using the example of FIG. 1, table 120 occupies a plurality of rows extending between columns C and F, while table 130 occupies a number of rows extending between columns B and H. Therefore, the insertion of rows between tables 120 and 130 within the column range C to F (to allow for the importation of new data within table 120) would tend to "break" table 130 by shifting the data in columns C to F below the other data in table 130. A similar result would be seen with table 140 where only two of the four columns of table 140 overlap the column range of table 120. Furthermore, similar problems would occur when data is deleted from table 120 (such as at the end of the month when the bank sends a written statement to its customers and deletes certain records from the online database).

It is with respect to these and other considerations that the present invention has been made.

SUMMARY OF THE INVENTION

The present invention relates to the modification of a dynamic table within an array (such as a two-dimensional spreadsheet) by the insertion or deletion of one or more records (e.g., rows) from the table. In order to maintain the integrity of subsequent tables within the array (e.g., those tables below the modified table) that may be affected by the edits to the modified table, the present invention first determines which subsequent tables at least partially overlap the boundary of the modified table (i.e., which subsequent tables include a first portion that would be unaltered by the changes to the modified table as well as a second portion that would be shifted within the array due to the changes to the dynamic table). In the example of a two-dimensional spreadsheet where rows are added or deleted from the modified table (i.e., when a row is added or deleted from only the column range of the modified table), the present invention determines which subsequent (e.g., lower) tables would have a first portion that falls outside of the column range (i.e., the "UCR") of the modified table and a second portion positioned within the UCR range of the modified table. Because the changes to the modified table will alter the UCR range of the subsequent table, the present invention shifts the first portion of the subsequent table (e.g., the portions of the subsequent table that lie to the left and/or the right of the UCR range of the subsequent table) so that the first and second portions of the subsequent table are properly aligned (and the integrity of the data within the subsequent table is maintained) following the changes to the modified table.

In accordance with certain aspects, the present invention calculates a column range "LCR/RCR" of the subsequent table that extends outside of the UCR column range and then shifts the LCR/RCR column range of the subsequent table to align the LCR/RCR column range with the UCR portion of the table that was previously shifted in response to the changes to the modified table. In the case where the modified table is expanded by the insertion of one or more rows, the present invention can immediately shift the LCR/RCR portions of the first subsequent table and then calculate a new UCR value that accounts for the entire column range of columns that have been shifted in the spreadsheet. A next subsequent table (e.g., a third table) would then be analyzed to determine whether it included a range of columns (i.e., an LCR/RCR range) that overlapped the updated UCR range of columns. If so, the LCR/RCR range of the third table would then be shifted as described above and the process would be repeated for all of the remaining "subsequent" tables in the spreadsheet.

In the case where the modified table is contracted by the deletion of one or more rows, the present invention preferably does not immediately delete rows to shift the LCR/RCR portions of the first subsequent table upward. On the contrary, in order to prevent an inadvertent deletion of data contained in independent cells above the subsequent table, the present invention first determines the maximum amount that each of the subsequent tables can be safely moved upward. Once each subsequent table is examined in a first pass, the preferred embodiment of the present invention proceeds to calculate a "minimum" move for all of the subsequent tables and then deletes a number of rows equal to the "minimum" value for each of the subsequent tables.

In this manner, the present invention maintains the desired spacing between each of the subsequent tables by shifting each of the tables upward by the same amount.

The invention may be implemented as a computer process, a computing system or as an article of manufacture such as a computer program product. The computer program product may be a computer storage medium readable by a computer system and encoding a computer program of instructions for executing a computer process. The computer program product may also be a signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

BRIEF DESCRIPTION OF THE DRAWINGS

FIG. 5 illustrates a portion of a spreadsheet screen display that includes multiple dynamic tables, wherein the screen display is annotated with a number of values that are used in accordance with an embodiment of the present invention.

FIG. 6 illustrates the spreadsheet screen display of FIG. 5 wherein the top table has been expanded by the insertion of two data rows, thereby breaking the integrity of the lower two tables.

FIG. 7 illustrates the spreadsheet screen display of FIG. 6 where the column ranges of the middle table that do not overlap the column ranges of the top table have been shifted down two rows to reintegrate the middle table in accordance with an embodiment of the present invention.

FIG. 8 illustrates the spreadsheet screen display of FIG. 7 where the sole column of the lower table that does not overlap the column ranges of the top and middle tables has been shifted down two rows to reintegrate the lower table in accordance with an embodiment of the present invention.

FIG. 10 illustrates a portion of a spreadsheet screen display that includes multiple dynamic tables similar to those shown in FIGS. 5-8, wherein the three data rows highlighted in the top table are to be deleted.

FIG. 11 illustrates the spreadsheet screen display of FIG. 10 following the deletion of the three rows from the top table thereby breaking the integrity of the lower two tables, and wherein the screen display is annotated with a number of values that are used in accordance with an embodiment of the present invention.

FIGS. 12-13 illustrate the spreadsheet screen display of FIG. 11 wherein separate determinations are made, in accordance with an embodiment of the present invention, regarding the ability of the middle and lower tables to shift upward without deleting any other (non-tabular) data contained within the spreadsheet.

FIGS. 14-16 illustrate the spreadsheet screen display of FIG. 11 wherein rows are both added and deleted as shown by the phantom boxes to shift the middle and lower tables upward to the maximum possible extent while maintain the original spacing between the middle and lower tables, in accordance with an embodiment of the present invention.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In general, the present invention relates to a method and system for modifying a table in a spreadsheet (such as by expanding or contracting the table) without altering or breaking the integrity of any lower or "subsequent" tables in the spreadsheet. Specifically, in a preferred embodiment, the present invention relates to altering a table, such as by inserting or deleting rows from the table (where the insertion or deletion of rows is limited to the column range of the table), while ensuring that the basic insertion and deletion operations do not compromise any subsequent tables that extend below the modified table such as those shown in the screen display of FIG. 1. However, while the below examples describe the insertion and deletion of rows from a table within a two-dimensional array or "spreadsheet," the present invention is not so limited and the described algorithms may be applied to any N-dimensional array where the array is expanded or contracted in only one of the dimensions. Alternatively, the invention could be applied to conventional two-dimensional tables that undergo expansion or contraction in the horizontal dimension (i.e., by adding or deleting columns rather than rows). In these cases, the "subsequent" table would be the next table located in the direction that the modified table expands or contracts.

Figure 1:
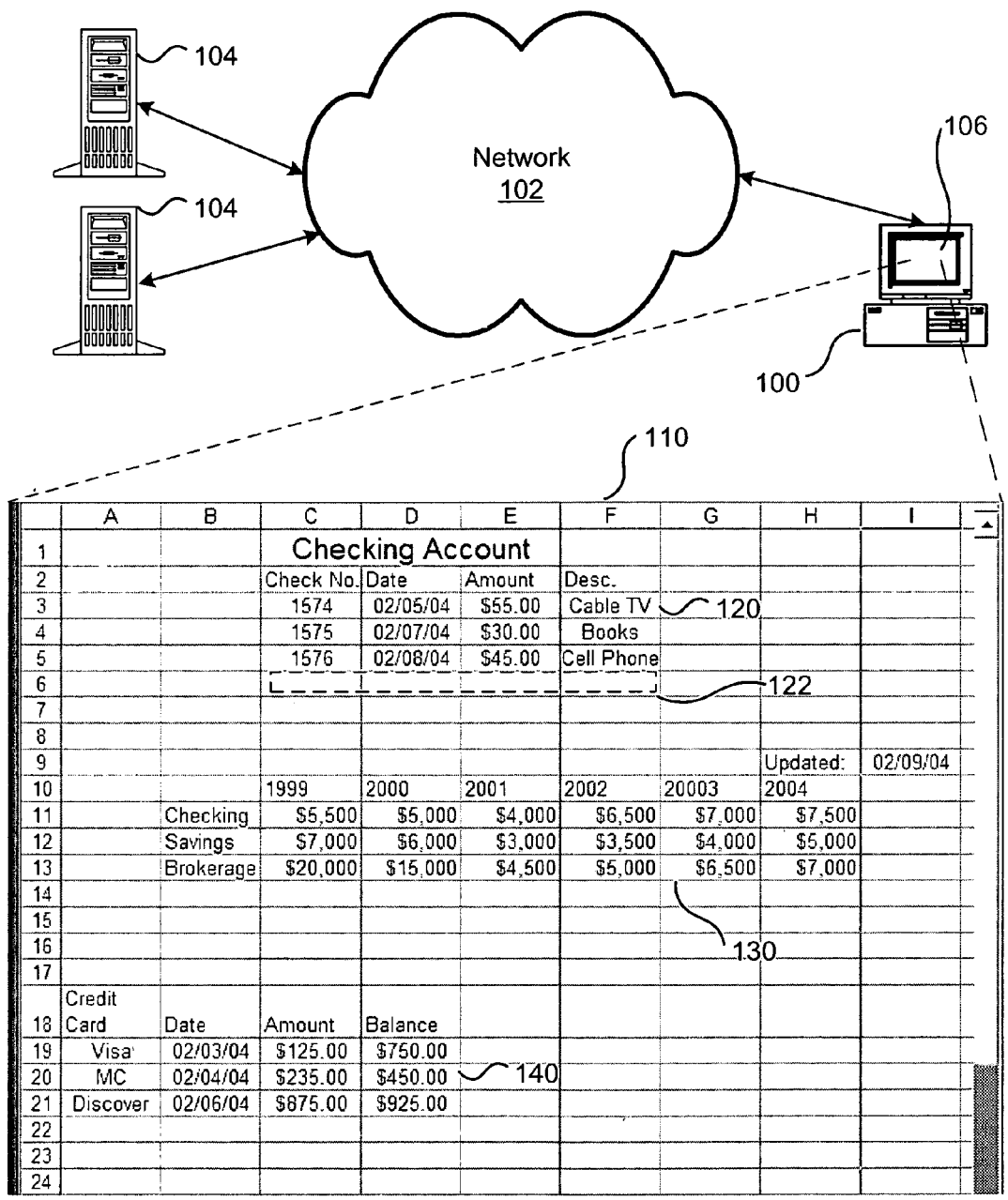
FIG. 1 illustrates an exemplary environment in which the present invention may be practiced, the environment embodying a client-server network wherein data may be imported to a client computer from a server computer to update dynamic tables within a spreadsheet displayed on a display device of the client computer.

FIG. 1 illustrates a client computer 100 that is connected via a network 102 to other computers 104. In one embodiment, the computers 104 may comprise servers on a local network or intranet 102, while in another embodiment the computers 104 may comprise Web servers that are connected to the Internet 102. For the purposes of the following discussion, it is presumed that the client computer 100 is operated by a user to access servers 104 at a bank or other financial institute for updating the user's financial records. However, it should be appreciated that the description of modifying a user's financial records is exemplary only and is provided to clearly illustrate the present invention. As such, the following example and the illustrative screenshots are not intended to limit the present invention. For example, the present invention is not limited to use within a networked environment, but rather may be used with a standalone computer as a user manually updates a table within a spreadsheet that contains other tables.

Returning to FIG. 1, the client computer 100 contains a display device 106 that displays in one preferred embodiment a spreadsheet 110. In the event that a user refreshes the spreadsheet 110, such as by connecting to the servers 104 and importing new data (e.g., records of newly cashed checks), it is likely that records (i.e., rows) will either be inserted within or deleted from the "top" table 120. Specifically, if new data is imported into the table 120 a number of rows are added to or "inserted" within the table starting at row 6. However, the insertion is limited to those columns that comprise table 120 and thus any new data will only be inserted within new rows extending from column C to column F, as shown by the dashed box 122.

The basic operation of inserting rows in a specific "column range" ensures that all cells outside that column range, as well as all cells above the starting row for the insertion, remain unaffected. A similar limitation is applied to a deletion of rows within a column range. While the cells immediately beneath the inserted or deleted rows will typically be affected by the modification to the table, it is the goal of the present invention to use the above-described basic operations (i.e., inserting and deleting rows) to maintain the integrity of all "lower" tables within a spreadsheet following the modification of a "higher" table. Specifically, the present invention cycles through all the tables in a spreadsheet that are positioned below a modified table and determines the different cell ranges that need to be shifted to maintain the integrity of the tables. For example, if a single row 122 were added to table 120 in FIG. 1, the present invention would determine that columns B, G and H in table 130 would need to be shifted down one row to account for the insertion of the row 122 in columns C to F. Next, the present invention would shift column A in table 140 down one row to maintain the integrity of table 140. A more detailed description of a preferred table "expansion" algorithm is provided below with respect to FIGS. 5-9. Furthermore, FIGS. 10-17 illustrate another preferred algorithm used in the case of a table "contraction" where rows are deleted from a table.

Figure 2:
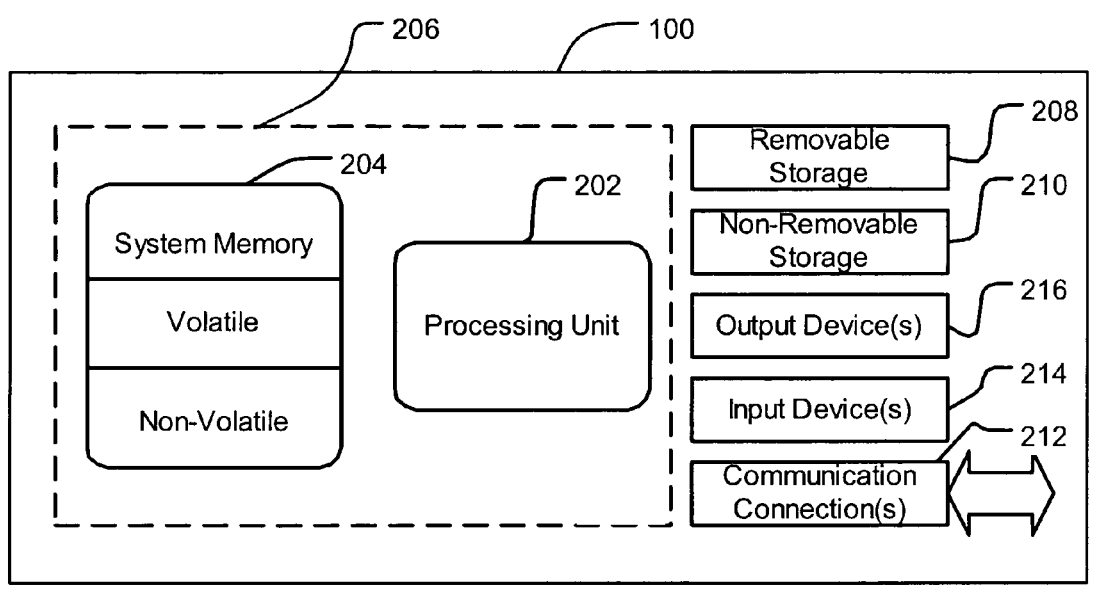
FIG. 2 shows a computer system that may be used according to particular aspects of the present invention.

FIG. 2 illustrates an example of a suitable computing system environment for the client computer 100 on which embodiments of the present invention may be implemented. Specifically, the system 100 is representative of a computing system that may be used to operate a spreadsheet program containing the present invention. In its most basic configuration, system 100 includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

In addition to the memory 204, the system 100 may include at least one other form of computer-readable media. Computer readable media, also referred to as a "computer program product," can be any available media that can be accessed by the system 100. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 100. Any such computer storage media may be part of system 100.

System 100 may also contain a communications connection(s) 212 that allows the system to communicate with other devices, such as the servers 104 through the network 102. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 100 includes peripheral devices, such as input device(s) 214 and/or output device(s) 216. Exemplary input devices 214 include, without limitation, keyboards, computer mice, pens, styluses, voice input devices, tactile input devices and the like. Exemplary output device(s) 216 include, without limitation, video displays, speakers, and printers. Each of these "peripheral devices" are well know in the art and, therefore, not described in detail herein.

With the computing environment in mind, the following figures are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
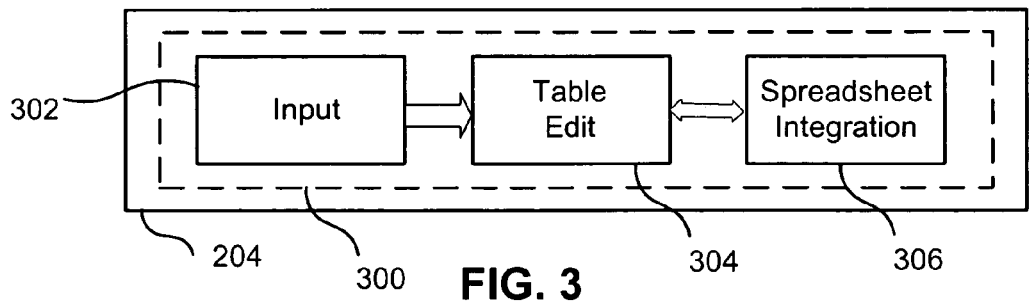
FIG. 3 illustrates a number of program modules employed within a spreadsheet application in accordance with an embodiment of the present invention.

Referring now to FIG. 3, a spreadsheet application 300 within the memory 204 of the computer system 100 is denoted by a phantom line and includes an input module 302 for receiving updates to a table within the spreadsheet 110, a table edit module 304 for incorporating the edits within the modified table (such as the table 120), and a spreadsheet integration module 306 for analyzing and updating all tables that are located below the modified table in order to maintain the integrity of the spreadsheet 110.

The input module 302 is responsible for receiving updates to the spreadsheet tables, and these updates may include receiving manual edits from a user actively working within the spreadsheet 110, as well as importing data from another computer system (such as the server 104 shown in FIG. 1). In one embodiment, the data is imported as a table list of an XML file where the list provides the starting row number and the column ranges for each table in the spreadsheet (as well as the data records that populate the tables), although the present invention is not limited to use with XML files. The function of the table edit module 304 and the spreadsheet integration module 306 are described in greater detail below with respect to various flow diagrams and screen illustrations.

Figure 4:
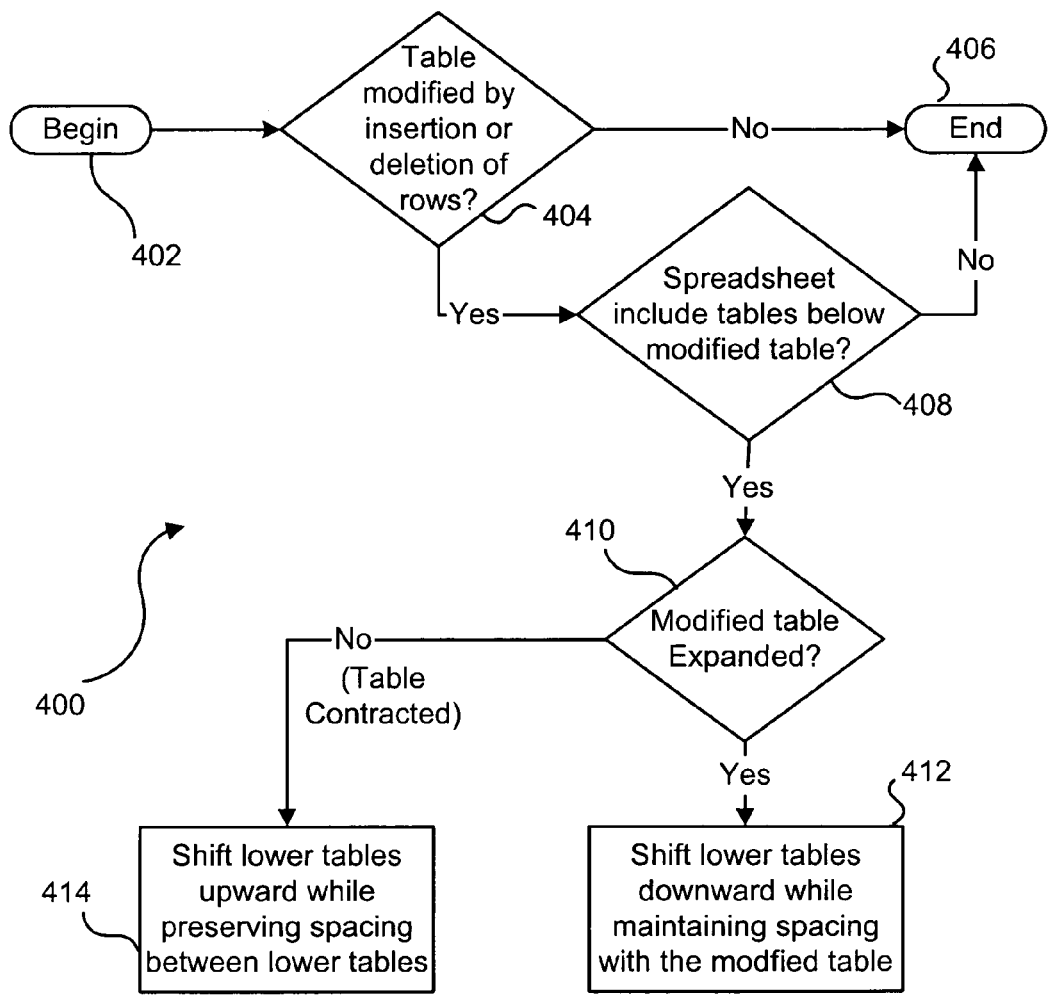
FIG. 4 is a flow diagram showing the operational characteristics performed by the spreadsheet application shown in FIG. 3 in accordance with the present invention.

Referring to FIG. 4, the table edit module 304 and the spreadsheet integration module 306 together perform a process 400 that begins at step 402 and proceeds to step 404 where it is determined whether a table within the spreadsheet 110 has been modified. The determination 404 is based on communication between the input module 302 and the table edit module 304 whenever the input module 302 receives input related to the spreadsheet 110. Specifically, the determination 404 checks to see whether the new table data received from the input module 302 will result in a modification to the structure of any of the spreadsheet tables, such as table 120 in FIG. 1. If there are no such modifications (e.g., if the table updates simply change the values of existing cells without adding or deleting any rows from the table), a negative determination is made at step 404 and the process 400 ends at step 406. However, if a table has been modified by either the insertion or deletion of one or more rows (i.e., a positive determination is made at step 404), the process continues to step 408 where the spreadsheet integration module 306 determines whether the spreadsheet includes additional tables that are positioned below the modified table.

If the modified table is the only table in the spreadsheet, or if there are no tables below the modified table, the process flow proceeds from the negative determination at step 408 and terminates at step 406. However, if the spreadsheet integration module 306 confirms the existence of lower or "subsequent" tables in the spreadsheet, the process flow continues to step 410 where the spreadsheet integration module 306 determines whether the modified table has been expanded or contracted. If a positive determination is made at step 410 (i.e., the modified table has been expanded), the process continues to step 412 where the lower tables are shifted downward to maintain the integrity of the lower tables while maintaining the original spacing between the lower tables and the modified table. A preferred algorithm for the expansion of the modified table and the downward shift of the lower tables as recited in step 412 is described in greater detail below with reference to FIG. 9. On the other hand, if the modified table has been contracted due to the deletion of rows (i.e., the determination at step 410 is negative), the process continues to step 414 where the lower tables are shifted upward to maintain the integrity of the lower tables while preserving the original spacing between the various lower tables. A preferred algorithm for the contraction of the modified table and the upward shift of the lower tables as recited in step 414 is described in greater detail below with reference to FIG. 17.

Figure 9:
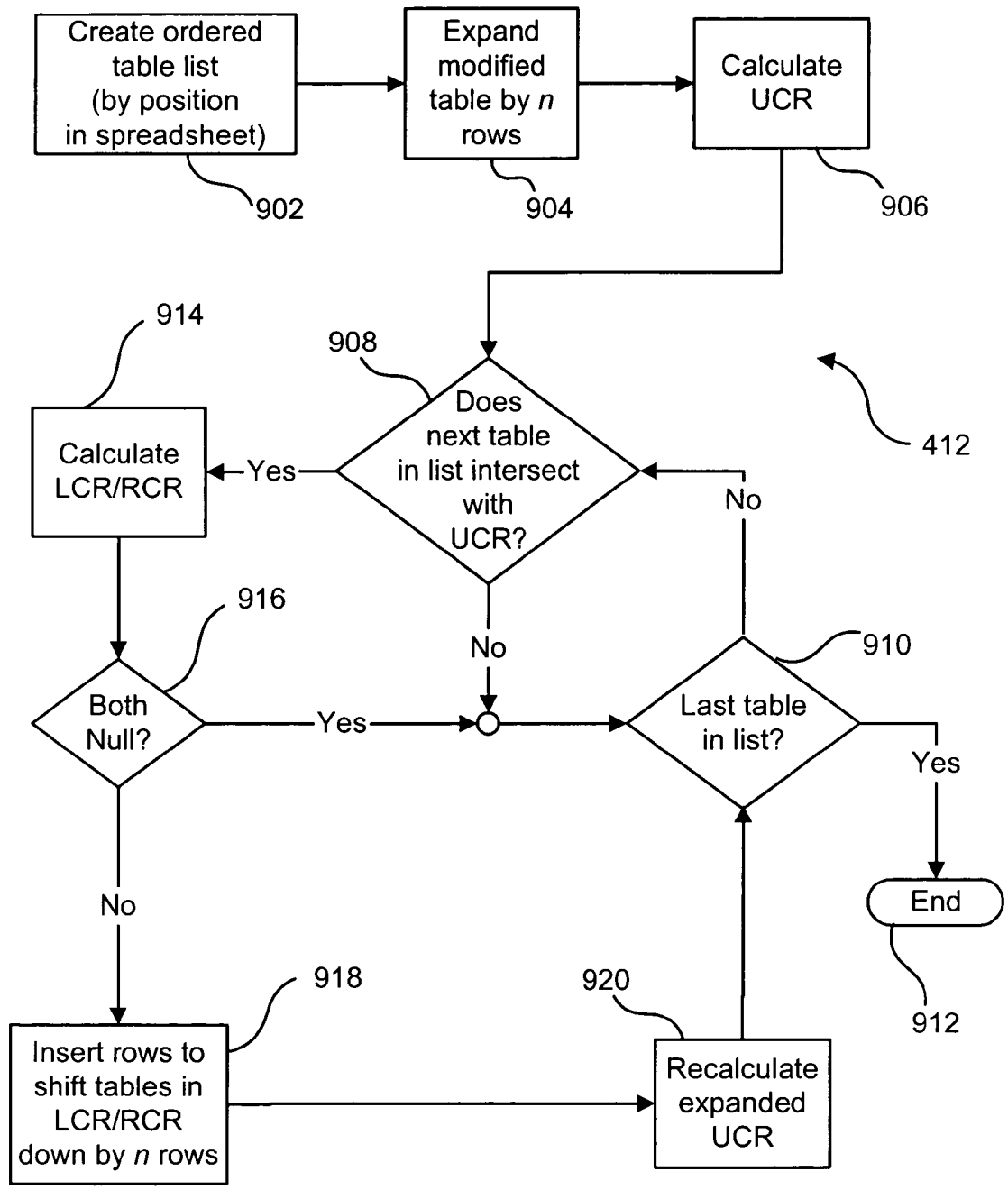
FIG. 9 is a flow diagram showing the operational characteristics performed in shifting the middle and lower tables downward following the expansion of the top table as shown in FIGS. 6-8, in accordance with an embodiment of the present invention.

Prior to describing the specific steps of the preferred expansion algorithm in FIG. 9, an enlarged illustration of the spreadsheet 110 from FIG. 1 is provided in FIG. 5, along with a plurality of references defining several variables that are recited in the algorithm. In particular, the tables 120, 130 and 140 of the spreadsheet 110 are each surrounded by a phantom line to clearly denote the respective table boundaries. Additionally, it is noted that the spreadsheet 110 includes some additional, independent (non-tabular) data 510 in cells H9 and I9. In the example of FIG. 5, this data 510 simply represents a user notation regarding the last time that the spreadsheet 110 was updated (such as by logging on to a financial institution Web site). Although the independent data cells 510 are contiguous with certain cells of table 120, the data cells 510 do not constitute part of table 120 since each table is defined as a rectangular region (as denoted by the phantom lines).

In the example spreadsheet 110 shown in FIGS. 5-8, the present invention is illustrated in the context of an initial modification to table 120 where the table is expanded by the insertion of two rows at the bottom of the table (and limited to the column range of the table) as shown in FIG. 6. FIG. 5 further illustrates the various iterations for certain variables used in the below-described table expansion algorithm. For example, FIG. 5 illustrates a first value or iteration for the variable "UCR" representing a "Union Column Range" that denotes the range of cells extending directly underneath a table in a spreadsheet together with the cell ranges of all tables above the table. The UCR variable can therefore be expressed as a value that includes the row number of the row immediately below the table and a column range for the table as denoted by the left-most column letter and the right-most column letter. In the case of table 120, the value of UCR1 would equal row 7, columns C to F (UCR1=7:C-F).

The next variables defined in FIG. 5 are the left and right column ranges "LCR" and "RCR," respectively. The LCR is the range of cells to the left of the UCR that is part of a table intersecting the UCR, while the RCR is the range of cells to the right of the UCR that is part of a table intersecting the UCR. These cell ranges must be shifted up or down as the above tables grow or shrink. In the example of FIG. 5, the LCR and RCR portions of table 130 (collectively referred to as "LCR/RCR") remain unaltered following the insertion of data within table 120. That is, while the UCR portion of table 130 is initially shifted downward by the insertion of rows in table 120, the LCR/RCR portions of table 130 are initially "unaltered" by the insertion of rows in table 120.

Specifically, the LCR value of table 130 is first row of the table in column B (i.e., LCR1=10:B-B), while the RCR value of table 130 is the first row of the table in columns G and H (i.e., RCR1=10:G-H). When rows are added to table 120 (as shown in FIG. 6), these rows are added in the range of columns C to F (i.e., UCR1) and, as a result, a similar number of rows must be added above the respective LCR1 and RCR1 ranges of cells to maintain the integrity of table 130. The steps of adding rows to the LCR1 and RCR1 ranges are shown in FIG. 7.

Specifically, in one embodiment of the present invention, rows are added above the LCR1 and RCR1 portions of table 130 so that these portions of table 130 are shifted down by an amount that matches the number of rows added to the bottom of table 120. This method is preferred since it maintains the desired spacing between the tables 120 and 130 and does not jeopardize other data contained within the spreadsheet 110 (such as the independent data 510 in cells H9 and I9). Alternatively, one skilled in the art may utilize other methods of shifting the cells in the LCR1 and RCR1 ranges of table 130, such as by moving (i.e., cutting and pasting) the affected cells so that they align properly with the portion of the table that overlaps the UCR1 range of table 120. However, such a method is not preferred due to the risk of overwriting data that may exist in the target cells of the cut and paste operation. For example, with reference to FIG. 6, if some independent data was contained in cell B15 prior to the insertion of two rows in table 120, a downward shift of the range LCR1 that occurs via a "move" or cut-and-paste operation would tend to overwrite the data contained in cell B15. Thus, the preferred method is to insert rows above the LCR1 and RCR1 ranges of table 130 as described above. Of course, the present invention is not limited to the preferred embodiment but rather is sufficiently broad to encompass any type of shifting movement provided that the integrity of the spreadsheet tables is maintained.

FIG. 7 further illustrates that the downward movement of the UCR1 and LCR1 portions of table 130 by two rows creates a split in table 140 whereby the cells of column A are now split from the remaining cells. The method of the present invention addresses this problem by continuing through an analysis loop (and iterating all the UCR, LCR and RCR variables) until all of the tables below the initially modified table (e.g., table 120) have been analyzed and shifted (if necessary) to maintain their integrity. Specifically, as shown in FIG. 5, a new UCR2 value is calculated as the sum of UCR1 together with LCR1 and RCR1. As defined above, the UCR2 value comprises the range of cells directly beneath a table (table 130 in this case) plus the range of cells beneath all tables above the table (i.e., table 120). Thus, the value of UCR2 would be set equal to row 14, columns B to H (UCR2=14:B-H). Note that the value of UCR2 does not change after the downward shift of table 130 shown in FIG. 6 (i.e., UCR2 starts at row 14 rather than row 16). Calculating the value of UCR2 based on the initial location of table 130 ensures that all of the potentially affected cell ranges are analyzed and shifted if necessary. For example, setting the value of UCR2 at row 14 reflects the possibility that table 140 could have originally started in row 15 rather than row 18 as shown in FIG. 5.

Once the UCR2 value has been calculated, the present invention calculates any LCR2 and RCR2 values for the next lowest table (i.e., table 140 in the present example). It is understood that a particular table might not have both an LCR and an RCR range and, in the present example, table 140 only includes an LCR2 value since table 140 does not extend to the right of the UCR2 range. Indeed, as described in greater detail below, it is possible that a lower table might not extend outside of the UCR column range and thus would not have either an LCR or an RCR value. Such tables are not separately "shifted" downward in the preferred embodiment of the invention since they will already have been shifted downward along with the above tables within the UCR range. Once the new LCR and RCR values (if any) are calculated, the cells within the respective ranges are shifted downward by the insertion of rows as described above. This is illustrated in FIG. 8 where two rows are inserted immediately above the LCR2 portion of table 140 so that the data cells in column A are shifted downward and reintegrated with the remainder of table 140.

FIG. 9 provides a flow chart of a preferred table expansion algorithm 412 that was described in general terms in FIG. 4. Specifically, once it has been determined that the modified table is being expanded by the insertion of rows, as described above, the first step 902 is to create an ordered list based on the starting row of all the tables in the spreadsheet 110 starting from the modified table and working vertically downward to the last table in the spreadsheet. In the example screenshots of FIG. 5, the ordered list would start with table 120 and then proceed to list table 130 and finally table 140. If more than one table starts on the same row, each occupying a different column range, the tables will be placed one after another randomly in the list as their positions relative to each other are not important. This ordered list is used to ensure that all the tables of the spreadsheet 110 are analyzed in a below-described processing loop.

Once the ordered list has been generated in step 902, the "modified table" (i.e., the first table in the list) is actually expanded in step 904 by inserting the new data rows. In the illustrated example of FIG. 6, table 120 represents the "modified table" and is expanded to include two new rows as highlighted by the phantom box 620. Specifically, using the example of the financial spreadsheet 110, the inserted rows 620 may represent an automatic update to the user's checking account that occurs when the user visits a bank Web site (as noted by the change in the date represented in cell 19).

In the preferred embodiment of the present invention, the modified table is expanded by adding rows to the table. Step 904 assigns the variable n to the number of rows that are inserted within the table. In the next step 906, the value UCR1 is calculated for the modified table. As described above, the value UCR for the modified table represents the range of column cells that extend directly beneath the modified table. In the example shown in FIG. 5, the value UCR1 equals the range from column C to F extending downward from row 7.

The next step 908 is a determination of whether the next table in the ordered list (e.g., the table 130 in FIG. 5) intersects with the current UCR value (e.g., UCR1) of the modified table. If the determination 908 is negative (i.e., if the next table in the list does not underlie the modified table), the process flow continues to step 910 which determines whether the table just analyzed was the last table of the ordered list. If there are no additional tables in the spreadsheet (i.e., a positive determination at step 910), the process flow terminates at step 912. However, if more tables are included in the list (i.e., there are more tables present in the spreadsheet below the modified table), the process flow loops back to the determination at step 908 where the next table is analyzed.

If the determination 908 is positive (i.e., if it is determined that the next table in the list does intersect with the previously calculated UCR value), the process flow continues to step 914 where the LCR and RCR values (if any) are calculated. The next step 916 then determines whether the LCR and RCR values are both null. In other words, step 916 determines whether the currently analyzed table is fully confined within the UCR range of the above table or tables. If step 916 results in a positive determination (so that the entire table will be moved downward as a result of the downward shifts of the above tables), there is no need to further analyze the present table and the process flow returns to step 910 which determines whether there are any further tables in the ordered list.

If the currently analyzed table does contain either an LCR or an RCR value (or both), then the determination at step 916 is negative and the process flow continues to step 918 where a number of rows (equal to the number n of rows that were inserted within the modified table) are inserted directly above the LCR and RCR portions of the table to shift those portions of the analyzed table down by n rows, thereby matching the earlier downward shift of the UCR portion of the table. In the example shown in FIGS. 6 and 7, the value of n equals two since two rows were inserted at the bottom of table 120. Positive values are determined for both LCR1 and RCR1 for table 130, and step 918 comprises inserting two rows directly above both the LCR1 and RCR1 portions of table 130 as shown in FIG. 7. The insertion of the two rows above each end of the table 130 causes the two end portions 730 and 732 of the table to move downward and become reintegrated with the middle portion of the table that resides within the UCR1 range of columns. That is, while the middle portion 630 (FIG. 6) of the table 130 was previously shifted down as a direct result of the expansion of table 120, the present invention results in the downward shift of the remaining LCR1 and RCR1 portions of table 130 to preserve the integral nature of the table.

Once the new rows have been inserted above either the LCR or RCR table portions (or both if applicable), the process flow continues to step 920 where the UCR value is recalculated. Specifically, as describe above, the UCR value for any given table is continually reset to equal the range of cells that lie directly beneath the table, as well as the range of those cells that lie beneath any of the previously modified tables (i.e., those tables above the currently analyzed table). In other words, the updated UCR value equals the prior UCR value plus the prior LCR and RCR values. Thus, in the example shown in FIG. 5, the (updated) value UCR2 equals the old value of UCR1 plus the values of LCR1 and RCR1. Specifically, UCR2 in FIG. 5 includes the range of columns from column B to column H starting at row 14.

Upon recalculating the value of UCR in step 920, the process flow returns to step 910 to determine whether the ordered list includes any mores tables in the spreadsheet below the previously analyzed table. In the example of FIGS. 5-8, the list contains table 140 and thus the process flow returns to step 908 where it is determined that the table 140 does indeed intersect with the column range defined by UCR2. The value LCR2 is then determined at step 914 (resulting in a negative determination at step 916), and n rows (where n=2) are inserted above the LCR2 range in step 918. The insertion of the two rows above the LCR2 portion of table 140 is shown in FIG. 8 where the highlighted portion 840 in column A is shifted down to match the remainder of the table.

Thus, the entire table 140 is actually moved downward in three separate operations as follows: first the rightmost portion 640 (FIG. 6) of the table (residing within the UCR1 column range) was moved downward two rows as a direct result of the modification of table 120. Next, the portion 740 (FIG. 7) of the table 140 (residing within the LCR1 column range) was shifted down two rows during the first trip through the processing loop of FIG. 9. Finally, the portion 840 (residing with the LCR2 column range) is shifted downward during the second pass through the algorithm of FIG. 9.

Finally, once the table 140 has been reintegrated as shown in FIG. 8, the UCR value is recalculated per step 920 (UCR3 is shown in FIG. 5) and the process returns to step 910 where it is determined that there are no further tables contained within the spreadsheet 110. The process flow then terminates at step 912.

The example shown in FIGS. 5-8 of a table insertion is only provided to help illustrate the expansion algorithm of FIG. 9 and should not be considered a limitation upon the scope of the present invention. As noted above, the downward shifts of the column ranges outside of UCR1 may be accomplished by means other than the insertion of rows, although row insertion is preferred to eliminate the possibility that data may be lost or overwritten as a result of the downward shifts. Additionally, the specific insertion point for the blank rows may vary, although it is preferred to insert the rows directly above the LCR and RCR portions of the table being shifted. Furthermore, while FIGS. 6 and 7 depict that the tables 130 and 140 in a split (non-integrated) form at certain points of the process, it is understood that a user of the spreadsheet program would not experience or view the tables in such a split state since the process of shifting the lower tables downward would occur substantially simultaneously with the initial modification of the table 120. Lastly, while the algorithm steps shown in FIG. 9 are preferably performed by the table edit module 304 and the spreadsheet integration module 306 shown in FIG. 3, it is understood that other modules of the spreadsheet program may be used to perform the various steps recited in FIG. 9.

While FIGS. 5-9 describe a preferred process for expanding a dynamic table, the present invention also operates to maintain the integrity of various spreadsheet tables when a dynamic table is contracted (such as by deleting one or more rows from the table). FIGS. 10-17 include screenshots and a flow chart that provide a detailed explanation of the preferred method of the present invention in the case where a table is contracted rather than expanded.

In FIG. 10, the spreadsheet 110 includes substantially the same three tables 120, 130 and 140 as described above for the expansion case. However, table 120 includes more records than the similar table in FIG. 5, and the phantom box 1000 in FIG. 10 denotes three rows of table 120 that are to be deleted. As described above, the deletion of the rows from table 120 may be due to a manual deletion by a user or may result from an automatic update of the table 120 (such as when a financial institution sends a client a written monthly statement and then deletes all old records from the customer-accessible database, leaving only the records of those transactions that occurred since the date of the written statement).

A contraction of a table relates to the deletion of rows from the "modified table" (e.g., the table 120 in FIG. 10). As with row insertion, the deletion of rows will not affect cells outside of the respective column range of the modified table nor will it affect cells positioned above the deleted rows. However, any tables that are positioned below the modified table and that overlap the UCR range of the modified table (FIG. 11) will be impacted by the row deletion and will thus be modified by the process of the present invention. Indeed, similar to the expansion case described above, the present invention attempts to shift the LCR and RCR portions of the lower tables up by n rows (i.e., the same number of rows that were deleted from the modified table). However, because such an upward shift of the lower or "subsequent" tables entails deleting rows to the left and right of the main UCR column range, the preferred embodiment of the present invention first checks to see if such row deletions will delete any existing cell data (i.e., non-tabular data contained in independent cells).

In the example screenshots shown in FIGS. 10-16, three rows 1000 (FIG. 10) are deleted from table 120 as described above. FIG. 11 illustrates that the immediate result of the row deletions includes the contraction of the table 120 and the upward shift of the table portions 1130 and 1140 that extend within the UCR1 range of the table 120. However, in a change from the algorithm described above for table expansions, the present invention does not immediately shift the remaining table portions upward to reintegrate the split tables 130 and 140 shown in FIG. 11. Rather, the invention first determines the maximum allowable upward shift of the remaining table portions and then adjusts either the initially shifted table portions (1130 and 1140) or the remaining table portions (i.e., the LCR and RCR portions of tables 130 and 140), or both, as required to reintegrate the tables without deleting any independent cell data contained in the spreadsheet 110.

FIGS. 12 and 13 illustrate that the LCR and RCR portions of tables 130 and 140 are first checked to determine whether any independent cell data will prevent an upward shift of these table portions via a deletion of rows from the respective LCR and RCR column ranges. For instance, FIG. 12 depicts a check of the LCR1 and RCR1 ranges to determine whether three rows may be deleted from these ranges, while FIG. 13 depicts a check of the LCR2 region. As shown by the double-headed arrow 1232 above the RCR1 portion of table 130 in FIG. 12, a deletion of the three rows immediately above the RCR1 portion would inadvertently delete the independent cell data 510 contained in cell H9. However, as shown by the arrow 1232, the RCR1 portion of table 130 could be safely shifted upward by two rows. The remaining checks above the LCR1 portion in FIG. 12 and the LCR2 portion in FIG. 13 do not show any impediment to the upward shift of those respective table portions (as indicated by the double-headed arrows 1230 and 1340 that do not encounter any blocking data in the three rows immediately above the LCR1 and LCR2 table portions).

Once it is determined that the maximum allowable upward shift of table 130 is only two rows, the present invention limits the upward shift of all of the lower tables to the maximum allowable upward shift of table 130 (unless one of the lower tables is also prevented from moving two row upwards as described in more detail below). In other words, the present invention determines that all of the lower tables (e.g., the tables 130 and 140) will be shifted upward together by a constant amount in order to preserve the existing spacing between the lower tables. However, because the initial deletion of rows from table 120 has already shifted portions of the lower tables upward by three rows (i.e., the portions 1130 and 1140 situated within the UCR1 range of table 120), the present invention first inserts a single row at the top of the UCR1 portion to shift the table portions 1130 and 1140 back down by a single row. Indeed, it is the combination of the downward shift of the UCR1 portion and the upward shifts of the LCR and RCR portions of the lower tables that finally reintegrates the lower tables 130 and 140.

The step of shifting the UCR1 portion of the spreadsheet downward is illustrated in FIG. 14 where a single row 1420 in inserted immediately below table 120 within the UCR1 column range. Furthermore, the insertion of the row 1420 has the effect of shifting the entire UCR1 region downward so that the UCR1 portions 1130 and 1140 of tables 130 and 140, respectively, are also shifted downward as shown in FIG. 14.

Finally, as shown in FIG. 15, the present invention deletes two rows from the LCR and RCR regions 1530, 1532 and 1540 of tables 130 and 140 since it was previously determined (see FIG. 12) that two rows represented the maximum allowable upward shift. At the conclusion of both the downward shift of the UCR region and the upward shifts of the LCR and RCR regions of the tables 130 and 140, the spreadsheet 110 appears as shown in FIG. 16. As described above, the present invention preserves the original spacing between tables 130 and 140 by determining the maximum allowable upward shift for each of the table regions and then applying the smallest value of all the maximum shifts to each of the table regions. Thus, only the spacing between the "modified" table and the next lowest table is not necessarily preserved as a result of the table contraction algorithm of the present invention. Indeed, in the example of FIGS. 10-16, the spacing between the modified table 120 and the next table 130 grows by one row due to the fact that the table 120 was contracted by three rows but the maximum allowable upward shift of the lower tables was only two rows.

Figure 17:
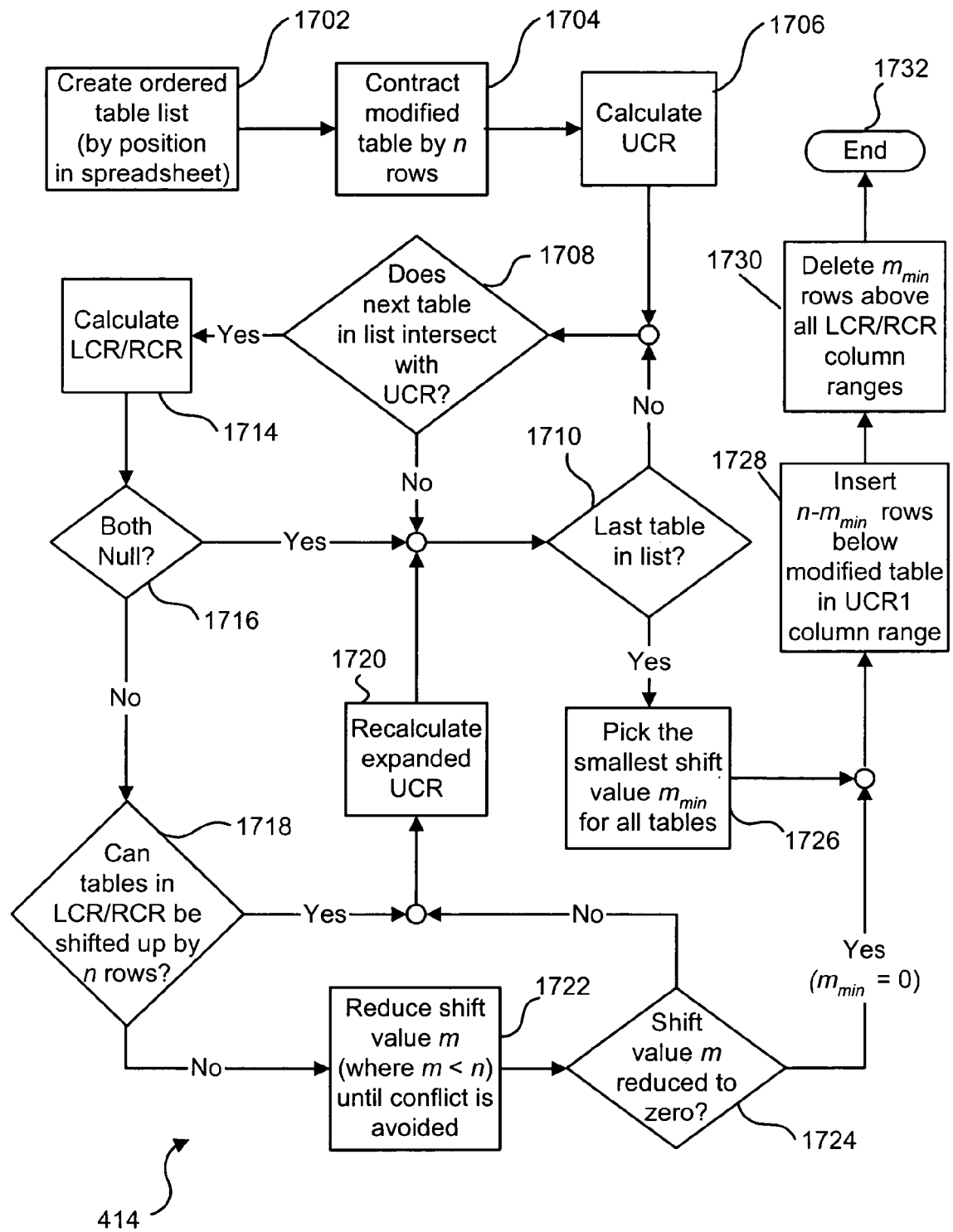
FIG. 17 is a flow diagram showing the operational characteristics performed in shifting the middle and lower tables upward following the contraction of the top table as shown in FIGS. 10-16, in accordance with an embodiment of the present invention.

FIG. 17 provides a flow chart of a preferred contraction algorithm 414 that was described in general terms in FIG. 4. Specifically, once it has been determined that the modified table is being contracted by the deletion of rows, as described above, the first step 1702 is to create an ordered list of all the tables in the spreadsheet 110 starting with table 120 and then working vertically downward to include tables 130 and 140. This ordered list is used to ensure that all the tables of the spreadsheet 110 are analyzed as described below.

The next step 1704 actually contracts the "modified table" (i.e., the first table in the list) by deleting "records" or data rows. In the illustrated example of FIGS. 10 and 11, table 120 represents the "modified table" and is contracted by deleting the three rows highlighted by the phantom box 1000 (FIG. 10). Step 1704 assigns the variable n to the number of rows that are deleted from the table 120, while the value UCR1 is calculated for the modified table in step 1706. In the example shown in FIG. 10, the value UCR1 equals the range from column C to F extending downward from row 9.

The next step 1708 is a determination of whether the next table in the ordered list (e.g., the table 130 in FIG. 10) intersects with the current UCR value (e.g., UCR1) of the modified table. If the determination 1708 is negative (i.e., if the next table in the list does not underlie the modified table), the process flow continues to step 1710 which determines whether the table just analyzed was the last table of the ordered list. If more tables are included in the list (i.e., there are more tables present in the spreadsheet below the modified table), the process flow loops back to the determination at step 1708 where the next table is analyzed.

If the determination at step 1708 is positive (i.e., if it is determined that the next table in the list does intersect with the previously calculated UCR value), the process flow continues to step 1714 where the LCR and RCR values (if any) are calculated. The next step 1716 then determines whether the LCR and RCR values are both null. In other words, step 1716 determines whether the table being currently analyzed is fully confined within the UCR range of the above table or tables. If step 1716 results in a positive determination (so that the entire table will be moved upward as rows are deleted from the above table or tables), there is no need to further analyze the present table and the process flow returns to step 1710 which determines whether there are any further tables in the ordered list.

If the currently analyzed table does contain either an LCR or an RCR value (or both), then the determination at step 1716 is negative and the process flow continues to step 1718 where a determination is made regarding whether a number of rows (equal to the number n of rows that were deleted from the modified table) can be deleted from the region directly above the LCR and RCR portions of the table so that the LCR and RCR portions can be shifted upward by n rows (thereby matching the prior upward shift of the UCR portion of the table). In the example shown in FIGS. 11-13, the value n equals three since three rows were deleted from table 120. Thus, because table 130 includes both LCR1 and RCR1 values, the determination in step 1718 checks the three rows above the LCR and RCR portions of table 130 as shown in FIG. 12. Specifically, the double-headed arrows 1230 and 1232 represent the maximum possible shift for the LCR and RCR table regions, respectively. If the determination in step 1718 is positive (i.e., there is no impediment to the upward shift), the process flow continues to step 1720 where the new UCR value is determined and the next table (if any) is checked. However, the present invention does not actually delete any rows from the LCR and RCR portions at this point within the algorithm (i.e., after a positive determination in step 1718). Rather, the preferred embodiment of the invention continues checking the lower tables to determine if any of those tables will be prevented from being shifted upward by the full amount of the value n. Only when all of the tables have been checked (and a smallest value of the maximum possible shift for all of the tables has been determined as described below) will any of the lower tables be shifted upward.

In the case that the determination at step 1718 is negative due to the presence of data cells that block the upward movement of a table (as in the example shown in FIG. 12), the process flow continues to step 1722 where a new "shift value" m is calculated to avoid any conflict with the existing data cells. Specifically, while there is no impediment to shifting the LCR portion of table 130 upward the full three rows (as denoted by the arrow 1230), the arrow 1232 illustrates that the RCR portion of table 130 cannot be shifted upward three rows to match the UCR portion of table 130. Instead, independent cell data 510 is located within row 9 of the RCR portion so that the "maximum allowable" upward shift for the RCR portion of table 130 is only two rows. Thus, step 1722 sets the "reduced shift value" m equal to two rows (i.e., m=2).

The next determination at step 1724 checks to see if the shift value m has been reduced to zero. The significance of this determination will be described in greater detail below, however, for the purposes of the present example (where m=2) a negative determination at step 1724 causes the process flow to return to step 1720 for the calculation of a new UCR value (e.g., UCR2). Specifically, UCR2 equals the old value of UCR1 plus the values of LCR1 and RCR1 (e.g., the range of columns from column B to column H starting at row 16 as shown in FIG. 10). Upon recalculating the value of UCR in step 1720, the process flow returns to step 1710 to determine whether the ordered list includes any mores tables in the spreadsheet below the previously analyzed table.

In the example of FIGS. 10-16, a negative determination is made at step 1710 (i.e., the last table in the list has not been analyzed since the list contains table 140) and the process flow returns to step 1708 where it is determined that the table 140 does indeed intersect with the new value of UCR2. The value LCR2 (FIG. 10) is then determined at step 1714 (resulting in a negative determination at step 1716), and the process continues to step 1718 where it is determined whether the LCR2 portion of table 140 can be shifted upward the full n rows (where n=3 in the present example). FIG. 13 graphically depicts a positive determination at step 1718 through the use of the double-headed arrow 1340 that extends upward three full rows without encountering any restrictions. Thus, at least for the UCR2 portion of the table 140, there is no need to calculate a reduced shift value m in step 1722. Rather, the process flow continues from the positive determination at step 1718 to step 1720 where the value UCR3 (FIG. 11) is determined.

Next, because the table 140 is the last table in the list, a positive determination at step 1710 directs the process flow to operation 1726 whereby a smallest value $m_{min}$ of the various "reduced shift values" m is selected. Although the present example only describes a single (and thus smallest) value m=2, it is understood that larger spreadsheets may include numerous tables having a plurality of maximum shift values m that are smaller than the number of rows n deleted from the originally modified table. As described above, the present invention ensures that all of the lower tables are shifted upward the same amount and thus the preferred algorithm detailed in FIG. 17 describes a two-pass process whereby it is first determined to what extent (if any) that each of the lower tables can be shifted upward (i.e., the value m for each table), and then the smallest shift value $m_{min}$ (i.e., the smallest value m for all the tables) is applied to each of the tables to be shifted.

Once a universal shift value $m_{min}$ is determined in step 1726, the algorithm continues to step 1728 where a number of rows equal to $n-m_{min}$ are inserted below the originally modified table in the UCR1 column range. In other words, because the original table (e.g., the table 120) was modified by the deletion of n rows, but the lower tables can only be shifted upward by $m_{min}$ rows (where $m_{min}$<n), the portions of the lower tables within the UCR1 column range (that were originally shifted up by n rows) must now be shifted back down by $n-m_{min}$ rows so that the UCR1 portions of the lower tables will be integrated with the remaining portions of the tables as described below.

In the next step 1730, the LCR and RCR portions of all the lower tables are shifted up $m_{min}$ rows by deleting the $m_{min}$ rows immediately above the respective LCR and RCR portions of the lower tables. The upward shift of $m_{min}$ rows in step 1730, combined with the downward shift of $n-m_{min}$ rows in step 1728, act to reintegrate the lower tables as described below.

In the example shown in FIGS. 14-16, step 1728 is accomplished by inserting $n-m_{min}$ rows below the originally modified table. Specifically, because the values of n=3 and $m_{min}$=2, the value of $n-m_{min}$ equals one row and FIG. 14 illustrates the insertion of one row below table 120 by the inclusion of the phantom box 1420 which encompasses row 6 between columns C and F. It is understood that the insertion the row 1420 causes all the cells in the UCR1 range to move down by one row as well, and thus the portions 1130 and 1140 of tables 130 and 140, respectively, are also shifted downward by one row as shown in FIG. 14. Next, the step 1730 of deleting the $m_{min}$ rows above each of the LCR and RCR ranges is illustrated in FIG. 15 by the phantom boxes 1530, 1532 and 1540. That is, the two rows encompassed by each of the boxes 1530, 1532 and 1540 are deleted in order to shift the LCR and RCR portions of tables 130 and 140 upward by two rows. This is further illustrated in FIG. 16 where the LCR and RCR portions 1630, 1632 and 1640 are highlighted by phantom boxes and are shown in their new (upward shifted) positions where they are integrated with the remainder of tables 130 and 140. Furthermore, the portion of table 140 in the LCR1 column region is highlighted by the separate box 1642 since it is moved upward two rows along with the LCR1 portion 1630 of table 130.

In the present example, once the tables 130 and 140 have been reintegrated as shown in FIG. 16, the process flow terminates at step 1712.

As noted above, the preferred embodiment of the present invention includes the separate step 1724 that determines if the shift value m has been reduced to zero. This separate determination is made any time a conflict is detected and a shift value m is calculated. Specifically, the separate determination 1724 operates to increase the efficiency of the algorithm in those cases where one of the lower tables cannot be shifted upward at all (i.e., m=0). In particular, if m=0 for any one of the lower tables, there is no need to continue checking the remaining tables since the two-pass process described in FIG. 17 utilizes the first pass to simply determine the smallest value of m (i.e., $m_{min}$) as noted in step 1726. Thus, whenever there is a positive determination at step 1724 so that the smallest value of m is already known (i.e., $m_{min}$=0), the process flow jumps directly to the final steps 1728 and 1730 where the UCR1 range is shifted back down by n rows (i.e., n−0=n), and the remaining LCR and RCR portions of the lower tables are not shifted upward at all (i.e., $m_{min}$=0).

The above described method and system provides the ability to maintain the integrity of all the tables in a spreadsheet when one of the tables is modified by the insertion or deletion of rows. Specifically, any overlapping tables below the modified table (that might otherwise be altered by the addition or deletion of rows from above) are analyzed to determine whether any portion of the lower table that lies outside of the column range of the modified table can be shifted to mirror the changes to the modified table. This may include the insertion or deletion of rows to match the original insertions or deletions to the modified table. Additionally, in the case where the originally modified table is contracted by the deletion of rows, the lower tables are first analyzed to determine whether there is any independent cell data that would be jeopardized by the deletion of rows from the spreadsheet. If such data is discovered the preferred method reduces or eliminates the upward shift of all the lower tables in order to preserve the independent cell data.

Although the invention has been described in language specific to structural features, methodological acts, and computer readable media containing such acts, it is to be understood that the invention defined in the appended claims is not necessarily limited to the specific structure, acts or media described. As an example, the table adjustment algorithms described in FIGS. 4, 9 and 17 may be performed by hardware modules rather than the specific software modules described in FIG. 3. Furthermore, as described above, the table adjustment algorithms may also be used with tables that expand and contract in the horizontal direction (i.e., by adding or deleting columns) or with any N-dimensional array that expands or contracts in any of its N dimensions. Therefore, the specific structure, acts or media are disclosed as preferred forms of implementing the claimed invention.

What is claimed is:

1. A method for modifying a dynamic table within an array while maintaining integrity of subsequent tables in the array, the method comprising:
    editing the dynamic table by selectively inserting at least one record to or deleting at least one record from the dynamic table, wherein the at least one record does not encompass an entire row of the array;
    determining whether a subsequent table within the array includes an initially unaltered first portion and a second portion that is shifted within the array by the step of editing the dynamic table; and
    shifting the first portion of the subsequent table within the array to align the first and second portions of the subsequent table.

2. A method as defined in claim 1 wherein the array comprises a two-dimensional spreadsheet and each record comprises a separate row within the dynamic table, and wherein the step of determining whether a subsequent table includes a second shifted portion comprises:
    calculating a Union Column Range (UCR) of cells that extends below the dynamic table; and
    determining whether a column range of the subsequent table overlaps the column range UCR of the dynamic table, wherein the overlapping column range of the subsequent table comprises the second portion of the subsequent table.

3. A method as defined in claim 2 wherein the step of shifting the first portion of the subsequent table within the spreadsheet comprises:
    calculating a collective Left Column Range/Right Column Range (LCR/RCR) of the subsequent table that extends outside of the UCR column range; and
    shifting the LCR/RCR column range of the subsequent table to align the LCR/RCR column range with the second portion of the subsequent table.

4. A method as defined in claim 3 further comprising:
    determining whether a third table within the spreadsheet includes an initially unaltered first portion and a second portion that is shifted within the spreadsheet by at least one of the steps of editing the dynamic table and shifting the first portion of the subsequent table; and
    shifting the first portion of the third table within the spreadsheet to align the first and second portions of the third table.

5. A method as defined in claim 3 wherein:
    the step of editing the dynamic table comprises inserting n rows to create a modified table, where n in an integer greater than zero, and wherein all cells within the UCR column range below the modified table are shifted downward n rows; and
    the step of shifting the first portion of the subsequent table within the spreadsheet comprises inserting n blank rows above the LCR/RCR column range of the subsequent table.

6. A method as defined in claim 5 further comprising:
    (a) calculating a new column range UCR2 of cells that extends below the modified table and the subsequent table;
    (b) determining whether a third table within the spreadsheet includes a first an initially unaltered first portion and a second portion that overlaps the column range UCR2; and
    (c) inserting n blank rows above the first portion of the third table to align the first and second portions of the third table.

7. A method as defined in claim 6 further comprising:
    repeating steps (a), (b) and (c) for each table below the third table in the spreadsheet so that an initially unaltered first portion of each such lower table is shifted downward by n rows to maintain the integrity of all the lower tables within the spreadsheet.

8. A computer program product readable by a computer and encoding instructions for executing the method recited in claim 5.

9. A method as defined in claim 3 wherein:
    the step of editing the dynamic table comprises deleting n rows to create a modified table, where n in an integer greater than zero, and wherein all cells within the UCR column range below the modified table are shifted upward n rows; and
    the step of shifting the first portion of the subsequent table within the spreadsheet comprises deleting n blank rows above the LCR/RCR column range of the subsequent table.

10. A method as defined in claim 3 wherein the step of editing the dynamic table comprises deleting n rows to create a modified table, where n in an integer greater than zero, and wherein all cells within the UCR column range below the modified table are shifted upward n rows, and wherein the step of shifting the first portion of the subsequent table within the spreadsheet comprises:
    calculating a maximum upward shift m for the LCR/RCR column range of the subsequent table, where m<n and the value of m is calculated to prevent data cells above the subsequent table from being deleted;

inserting (n−m) blank rows below the modified table in the UCR column range; and deleting m blank rows above the LCR/RCR column range of the subsequent table.

11. A computer program product readable by a computer and encoding instructions for executing the method recited in claim 10.

12. A method as defined in claim 3 wherein the step of editing the dynamic table comprises deleting n rows to create a modified table, where n in an integer greater than zero, and wherein all cells within the UCR column range below the modified table are shifted upward n rows, and wherein the step of shifting the first portion of the subsequent table within the spreadsheet comprises:

(a) calculating a maximum upward shift $m_1$ for the LCR/RCR column range of the subsequent table, where $m_1 < n$ and the value of $m_1$ is calculated to prevent data cells above the subsequent table from being deleted;

(b) calculating a new column range UCR2 of cells that extends below the modified table and the subsequent table;

(c) determining whether a third table within the spreadsheet includes an initially unaltered first portion and a second portion that overlaps the column range UCR2;

(d) calculating a maximum upward shift $m_2$ for the LCR/RCR column range of the third table, where $m_2 < n$ and the value of $m_2$ is calculated to prevent data cells above the third table from being deleted;

(e) selecting a minimum shift value $m_{min}$ that equals the smaller of the values for $m_1$ and $m_2$;

(f) inserting (n−$m_{min}$) blank rows below the modified table in the UCR column range; and (g) deleting $m_{min}$ blank rows above the LCR/RCR column ranges of the subsequent and third tables.

13. A method as defined in claim 12 further comprising:
repeating steps (b), (c) and (d) for each table below the third table in the spreadsheet so that the value $m_{min}$ selected in step (e) equals the smallest of all the values m for each of the tables below the modified table, and wherein step (g) further comprises deleting $m_{min}$ blank rows above the LCR/RCR column ranges of all of the tables below the modified table.

14. A computer program product readable by a computer and encoding instructions for executing the method recited in claim 1.

15. A system for modifying a dynamic table within an array while maintaining integrity of subsequent tables in the array, the system and the array stored in memory of a computer, the system comprising:

an input module for receiving edits to the dynamic table;

a table edit module for selectively inserting at least one record to or deleting at least one record from the dynamic table in accordance with instructions received from the input module, wherein the at least one record does not encompass an entire row of the array; and a spreadsheet integration module for determining whether a subsequent table within the array includes an initially unaltered first portion and a second portion that is shifted within the array in response to an insertion or deletion of records in the dynamic table by the table edit module, the spreadsheet integration module further operating to shift the first portion of the subsequent table within the array to align the first and second portions of the subsequent table.

16. A system as defined in claim 15 wherein the array comprises a two-dimensional spreadsheet and each record comprises a separate row within the dynamic table, and wherein the spreadsheet integration module further operates to:

calculate a Union Column Range (UCR) of cells that extends below the dynamic table; and determine whether a column range of the subsequent table overlaps the column range UCR of the dynamic table, wherein the overlapping column range of the subsequent table comprises the second portion of the subsequent table.

17. A system as defined in claim 16 wherein the spreadsheet integration module further operates to:

calculate a collective Left Column Range/Right Column Range (LCR/RCR) of the subsequent table that extends outside of the UCR column range; and shift the LCR/RCR column range of the subsequent table to align the LCR/RCR column range with the second portion of the subsequent table.

18. A system as defined in claim 17 wherein the spreadsheet integration module further operates to:

determine whether a third table within the spreadsheet includes an initially unaltered first portion and a second portion that is shifted within the spreadsheet by at least one of the edits to the dynamic table and the shifting of the first portion of the subsequent table; and shift the first portion of the third table within the spreadsheet to align the first and second portions of the third table.

19. A system as defined in claim 17 wherein:

the table edit module edits the dynamic table by inserting n rows to create a modified table, where n in an integer greater than zero, and wherein all cells within the UCR column range below the modified table are shifted downward n rows; and the spreadsheet integration module shifts the first portion of the subsequent table within the spreadsheet by inserting n blank rows above the LCR/RCR column range of the subsequent table.

20. A system as defined in claim 19 wherein the spreadsheet integration module further operates to:

(a) calculate a new column range UCR2 of cells that extends below the modified table and the subsequent table;

(b) determine whether a third table within the spreadsheet includes a first an initially unaltered first portion and a second portion that overlaps the column range UCR2; and (c) insert n blank rows above the first unaltered portion of the third table to align the first and second portions of the third table.

21. A system as defined in claim 20 wherein the spreadsheet integration module further operates to:

repeat steps (a), (b) and (c) for each table below the third table in the spreadsheet so that an initially unaltered first portion of each such lower table is shifted downward by n rows to maintain the integrity of all the lower tables within the spreadsheet.

22. A system as defined in claim 17 wherein:

the table edit module edits the dynamic table by deleting n rows to create a modified table, where n in an integer greater than zero, and wherein all cells within the UCR column range below the modified table are shifted upward n rows; and the spreadsheet integration module shifts the first portion of the subsequent table within the spreadsheet by deleting n blank rows above the LCR/RCR column range of the subsequent table.

23. A system as defined in claim 17 wherein the table edit module edits the dynamic table by deleting n rows to create a modified table, where n in an integer greater than zero, and wherein all cells within the UCR column range below the modified table are shifted upward n rows, and wherein the spreadsheet integration module operates to:

calculate a maximum upward shift m for the LCR/RCR column range of the subsequent table, where m<n and the value of m is calculated to prevent data cells above the subsequent table from being deleted;

insert (n−m) blank rows below the modified table in the UCR column range; and delete m blank rows above the LCR/RCR column range of the subsequent table.

24. A system as defined in claim 17 wherein the table edit module edits the dynamic table by deleting n rows to create a modified table, where n in an integer greater than zero, and wherein all cells within the UCR column range below the modified table are shifted upward n rows, and wherein the spreadsheet integration module operates to:

(a) calculate a maximum upward shift $m_1$ for the LCR/RCR column range of the subsequent table, where $m_1$<n and the value of $m_1$ is calculated to prevent data cells above the subsequent table from being deleted;

(b) calculate a new column range UCR2 of cells that extends below the modified table and the subsequent table;

(c) determine whether a third table within the spreadsheet includes an initially unaltered first portion and a second portion that overlaps the column range UCR2;

(d) calculate a maximum upward shift $m_2$ for the LCR/RCR column range of the third table, where $m_2$<n and the value of $m_2$ is calculated to prevent data cells above the third table from being deleted;

(e) select a minimum shift value $m_{min}$ that equals the smaller of the values for $m_1$ and $m_2$;

(f) insert (n−$m_{min}$) blank rows below the modified table in the UCR column range;

(g) delete $m_{min}$ blank rows above the LCR/RCR column ranges of the subsequent and third tables.

25. A system as defined in claim 24 wherein the spreadsheet integration module further operates to:

repeat steps (b), (c) and (d) for each table below the third table in the spreadsheet so that the value $m_{min}$ selected in step (e) equals the smallest of all the values m for each of the tables below the modified table; and delete $m_{min}$ blank rows above the LCR/RCR column ranges of all of the tables below the modified table.

* * * * *